Patented Oct. 14, 1930

1,778,020

UNITED STATES PATENT OFFICE

SELWYN GWILLYM BLAYLOCK, FREDERICK ERIC LEE, AND PETER FINDLAY McINTYRE, OF TRAIL, BRITISH COLUMBIA, CANADA, ASSIGNORS TO THE CONSOLIDATED MINING AND SMELTING COMPANY OF CANADA, LIMITED, OF MONTREAL, QUEBEC, CANADA, A CORPORATION OF CANADA

PROCESS FOR AND RELATING TO THE SEPARATION OF GOLD, SILVER, AND LEAD FROM ANTIMONY ORES, ANTIMONY FLUE DUSTS, AND ANTIMONIAL BY-PRODUCTS

No Drawing. Application filed May 3, 1929, Serial No. 360,304, and in Canada May 21, 1928.

Our invention relates to the reduction of oxidized antimony ores, antimony flue dusts, and antimonial by-products, with carbonaceous matter and soda ash and the fractionation of the reduced antimony into two parts, one containing substantially all the gold, silver, and lead, and the other in the nature of a slag, containing the major part of the antimony and the soda ash, this slag being substantially free from the gold, silver and lead contents of the material treated.

An ordinary reverberatory furnace is used to carry this invention into effect.

The antimonial charge is admixed with lead so that the weight ratios of the silver to the lead are approximately 2.25 to 100, apart from the proportion if any of the lead which may be required for the gold, and the weight ratios of the gold to the lead are approximately 4 to 100, apart from the proportion, if any, of lead which may be required for the silver, but the lead contents should be limited as much as possible. These conditions being satisfied, the antimonial charge and lead are admixed with sufficient carbonaceous material to effect a reduction of 10% to 20% of the total metal contents, and a sufficiency of soda ash is added to ensure that the slag will remain liquid at the conclusion of the furnace treatment. After melting the resultant charge resolves into two fractions, one antimony metal containing substantially all the gold, silver, and lead contents of the material treated, and another, antimony soda slag containing the major part of the antimony in the material treated substantially free from gold, silver, and lead. The former fraction is treated for the recovery of the contained gold, silver, and lead by ordinary metallurgical methods; the latter fraction is admixed with excess of carbonaceous matter and reduced to metal in a reverberatory furnace in the usual manner. The following example is illustrative of the operation:

40,000 lbs. of flue dust yields 28,750 lbs. of slag and 815 lbs. of metal.

The metal fall is 4.5% of the flue dust treated and contains 100% of the contained gold, 71% of the contained silver, and 20% of the contained lead.

Having thus fully described our invention what we claim as new and desire to secure by Letters Patent is:

1. A process for separating gold, silver, and lead from roasted or oxidized antimony ores, antimonial flue dust and antimonial by-products by admixing therewith sufficient lead so that the silver content is approximately 2.25% of the contained lead over and above the lead required for the gold, and the gold content is aproximately 4% of the contained lead over and above the lead required for the silver, effecting a reduction of the metal contents of the charge by the addition of a reducing agent, maintaining the slag in a fluid condition throughout the furnace treatment by the addition of soda ash for dividing the charge into two fractions, one antimony metal containing substantially all the gold, silver, and lead, and the other antimony soda slag.

2. A process for separating gold, silver, and lead, from roasted or oxidized antimony ores, antimonial flue dust and antimonial by-products by admixing therewith sufficient lead so that the silver content is approximately 2.25% of the contained lead over and above the lead required for the gold, and the gold content is approximately 4% of the contained lead over and above the lead required for the silver, effecting a reduction of the metal contents of the charge by the addition of a reducing agent, maintaining the slag in a fluid condition throughout the furnace treatment by the addition of soda ash for dividing the charge into two fractions, one antimony metal containing substantially all the gold, silver, and lead, and the other antimony soda slag, treating the former fraction by known metallurgical methods for the recovery of the contained gold, silver, and lead, and the latter fraction with an excess of carbonaceous material and then reducing it to metal.

Dated at the city of Trail, in the District of Kootenay and Province of British Columbia, this 7th day of March, 1929.

SELWYN GWILLYM BLAYLOCK.
FREDERICK ERIC LEE.
PETER FINDLAY McINTYRE.